United States Patent [19]

Farwer

[11] Patent Number: 5,210,389
[45] Date of Patent: May 11, 1993

[54] SHIELDING GAS FOR ARC WELDING OF ALUMINUM

[75] Inventor: Alfward Farwer, Meersbusch, Fed. Rep. of Germany

[73] Assignee: Messer Griesheim GmbH, Frankfurt, Fed. Rep. of Germany

[21] Appl. No.: 766,337

[22] Filed: Sep. 26, 1991

Related U.S. Application Data

[63] Continuation-in-part of Ser. No. 746,984, Aug. 19, 1991, abandoned.

[30] Foreign Application Priority Data

Sep. 5, 1990 [DE] Fed. Rep. of Germany ....... 4028074

[51] Int. Cl.$^5$ .............................................. B23K 9/16
[52] U.S. Cl. .................................. 219/74; 219/137 R
[58] Field of Search .............................. 219/74, 137 R

[56] References Cited

FOREIGN PATENT DOCUMENTS 1215835 11/1963 Fed. Rep. of Germany ........ 219/74
46-43287 12/1971 Japan ..................................... 219/74
48-37339 6/1973 Japan .

*Primary Examiner*—Clifford C. Shaw
*Attorney, Agent, or Firm*—Connolly & Hutz

[57] ABSTRACT

A shielding gas for the arc welding of aluminum consists of argon or mixtures of argon and helium. The shielding gas also includes an admixture of 80 ppm to 250 ppm of nitrogen.

6 Claims, 1 Drawing Sheet

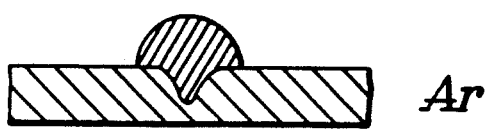
Fig.1A. Ar
Fig.1B. Ar+150vpm N₂
Fig.2A. Ar
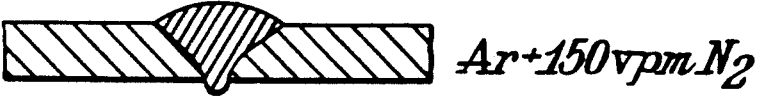
Fig.2B. Ar+150vpm N₂
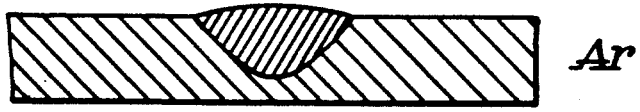
Fig.3A. Ar
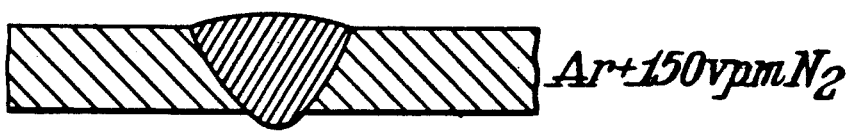
Fig.3B. Ar+150vpm N₂

SHIELDING GAS FOR ARC WELDING OF ALUMINUM

CROSS-REFERENCE TO RELATED APPLICATION

This application is a continuation-in-part of Ser. No. 746,984, filed Aug. 19, 1991 now abandoned.

BACKGROUND OF INVENTION

In the case of tungsten-inert gas welding TIG or in the case of metal-inert gas welding (MIG), various factors impose far greater limitations on the choice of the shielding gas than is the case, for example, with metal-active gas welding (MAG). Thus, with MAG welding, active components such as oxygen and carbon dioxide are frequently added to the basic gas, argon, which is often used in this type of welding. THis gives rise to substantial improvements in the welding process as well as in the welding results in comparison to welding with a pure inert gas, that is to say, with argon, helium or argon-helium mixtures.

The limitations are particularly pronounced with respect to the addition of other components to the inert gas used for aluminum welding. Here, disruptive effects occur immediately due to the high level of reactivity of the aluminum. Thus, for instance, hydrogen causes the formation of pores, while oxygen and nitrogen form oxides or nitrides. Just in terms of the appearance of the welding seam, this is not acceptable. For this reason, when aluminum is being welded, technically pure inert gases, that is, argon or argon-helium mixtures with a degree of purity of at least 99.996% are used. Consequently, the sum of all of the impurities amounts to a maximum of 40 ppm.

SUMMARY OF INVENTION

The invention is based on the task of finding a shielding gas on the basis of argon or argon-helium mixtures for the arc welding of aluminum which, by means of the addition of another component, makes it possible to improve the welding process and the welding results in comparison to welding with a pure inert gas, without the occurrence of disruptive side effects.

In the case of TIG welding or MIG welding of aluminum, the purest possible argon or else the purest possible mixtures or argon and helium are used as the inert gas. For purposes of improving the welding process and the welding results, 80 ppm to 250 ppm, preferably 120 ppm to 180 ppm, of nitrogen are added to the inert gas.

THE DRAWINGS

FIGS. 1a and 1b show comparative tests between pure argon and argon with a nitrogen addition with a metallic-inert gas build-up weld;

FIGS. 2a and 2b similarly show such comparative tests for a tungsten-arc weld; and FIGS. 3a and 3b similarly show such comparative tests for a tungsten-arc weld.

DETAILED DESCRIPTION

It has been surprisingly found that advantageous effects result from the admixture according to the invention of small amounts of nitrogen which, on the one hand lie well above the permissible maximum level of impurity in the shielding as and, on the other hand, lie markedly below the usual admixture amounts for gas mixtures. Therefore, the leeway that exists for the addition of nitrogen is very limited, ranging between 80 ppm at the minimum and 250 ppm at the maximum.

The advantages of TIG alternating-current welding consist mainly in a more smoothly and stably burning arc. When compared to the welding process according to state of the art, the arc is more concentrated and allows greater energy utilization.

The advantages of MIG welding of aluminum are likewise numerous. Here, too, there is very smooth material transfer, with the result that the seams remain extremely bright. Moreover, it also gives rise to an improved, very smooth seam-flank fusion and the penetration is intensified.

The preferred range for the nitrogen admixture according to the invention goes from 120 ppm all the way to 180 ppm, with the ideal value at around 150 ppm.

In the case if nitrogen contents below 80 ppm, the above-mentioned advantageous effects disappear, while nitrogen contents about 250 ppm bring about disruptive side effects occur. Thus, for instance, disruptive discoloration of the seam occurs with the TIG welding, while the fillet welds sag strongly in the case of MIG welding.

The shielding gas with the nitrogen admixture according to the invention can be produced in various ways. Either the mixture is made directly from the initial components, or else a parent mixture having a higher concentration is first made, which is then added in the form of gas. Since the advantageous effects of the nitrogen admixture according to the invention remain fairly constant over a relatively wide concentration range ($\pm 20\%$ of the ideal value), in principle, the nitrogen, for example, can also be added directly to the argon in the case of a liquid supply.

In special cases, in addition to nitrogen, its also possible to add some oxygen, likewise in amounts which are just slightly above the level of impurities permissible in the technical-grade inert gas. In this process, the oxygen bonds with the nitrogen to form nitrogen monoxide, which can suppress the formation of ozone.

Comparative tests were carried out on fusion penetration between pure argon and an argon with the addition of 150 ppm of nitrogen.

The fusion penetration behavior can be especially well depicted in comparison with so-called build-up welding, whereby the welding procedure is carried out in such a way that there is not complete root penetration.

FIG. 1 shows the result of a metallic-inert gas build-up weld at 100 A on a 5-mm thick aluminum sheet. A 1.2-mm thick wire electrode made of an Al-Si alloy (AlSi$_5$) was employed. The welding speed was 0.3 meters per minute. When pure argon is used, the result is very unstable welding, the metal does not bond properly to the sheet and the filler metal accumulates as a reinforced weld. In contrast, the addition of a small amount of nitrogen intensifies fusion penetration to such an extent that the result is a smooth, flawless welding bead on the upper side, with a normal fusion-penetration profile and secure flank formation.

FIG. 2 shows a full-fusion weld on a 5-mm sheet of metal with a wire electrode made of an Al-Mg-Mu alloy (AlMg$_4$, 5 Mn). Here, pure argon at a current of 130 A produced inadequate fusion penetration, whereas complete root penetration was achieved with the addition of 150 ppm of nitrogen. The welding speed was 0.35 meters per minute. Moreover, the upper side of the weld seam had finer ripples and there was less reinforcement on the weld seam.

FIG. 3 shows the fusion penetrations of a tungsten-arc weld on an 8-mm sheet of metal at 250 A as a comparison. If complete root penetration with argon is desired, the welding speed has to be reduced by approximately 20 percent.

Moreover, a basic advantage of the nitrogen mixture is that the ignition behavior as well as the stability of the arc were always more favorable.

What is claimed is:

1. In a shielding gas for the arc welding of aluminum, consisting of argon, the improvement being in an admixture of 80 ppm to 250 ppm of nitrogen to the gas whereby said shielding gas consists solely of argon and nitrogen.

2. Shielding gas according to claim 1, characterized by an admixture of 120 ppm to 180 ppm of nitrogen.

3. In a process for tungsten-inert gas welding and metal-inert gas welding of aluminum, the improvement being in that 180 ppm to 250 ppm of nitrogen are added to the inert gas consisting or argon or of mixtures of argon and helium.

4. Process according to claim 3, characterized in that 120 ppm to 180 ppm of nitrogen are added to the inert gas.

5. In a shielding gas for the arc welding of aluminum, consisting of a mixture of argon and helium, the improvement being in an admixture of 80 ppm to 250 ppm of nitrogen to the gas whereby said shielding gas consists solely of argon, helium and nitrogen.

6. Shielding gas according to claim 5, characterized by an admixture of 120 ppm to 180 ppm of nitrogen.